Reissued May 8, 1934 Re. 19,161

UNITED STATES PATENT OFFICE 19,161

FILTRATION OF PETROLEUM TARS

Carlyle D. Read, Dunkirk, N. Y., and Roger L. Holcomb, Wood River, Ill., assignors to Standard Oil Company, Whiting, Ind., a corporation of Indiana No Drawing. Original No. 1,830,962, dated November 10, 1931, Serial No. 267,793, April 5, 1928. Application for reissue June 24, 1932, Serial No. 619,118

20 Claims. (Cl. 196—147)

This invention relates to the filtration of petroleum tars for the purpose of separating them from solid matters contained therein.

While the invention is applicable to the filtration of any hot tar and, particularly, hot petroleum tars, it is particularly applicable to the filtration of lime-containing residues from cracking operations in the manner described in the co-pending application of one of us, Serial No. 201,004, filed June 23, 1927. In such operations, hot residues or pressure tars produced in the cracking of hydrocarbon oils are admixed with lime and are then passed through a filter element. Such tars or residues ordinarily contain small particles of carbonaceous, or coke-like materials and calcium compounds. The added lime in the hot tar forms calcium sulfide and there also occurs, to a considerable extent, a mutual coagulation between carbonaceous constituents of the tars and the lime.

In actual operation, the tar is forced into a pressure filter at a high temperature since it then possesses a low viscosity which facilitates the passage of the fluid through the filter leaves and its separation from solid matter which it may contain, for example, coke, lime, calcium sulfide, etc. As a suitable filtering temperature 600° F. may be mentioned, although the invention is not intended to be limited thereto since any high temperature, at which the tar is of sufficient low viscosity may be employed. The tar is pumped in until the rate of filtration falls below the economic limit, whereupon the press is cleaned.

To prevent ignition when the press is opened and the cake exposed to the air, it is necessary to cool the system. This is suitably effected by passing steam through the press in the same manner as the feed. The supply of steam may be continued until the effluent steam in the filtrate line falls to about 350° F., whereupon the press is opened and the cake removed by shaking the leaves.

When operating in the manner above described, it is found that the leaves retain, as material separated from the hot tars and residues, a layer of oily lime, coke and calcium sulfides which frequently ignite spontaneously. Such fires quickly burn through the fine wire filter cloth and involve considerable delay and expense for repairs.

According to the present invention, a deposit or layer of a suitable incombustible mineral matter is applied to the filter-leaves before the tar filtering operation. Among materials suitable for such deposit may be mentioned kieselguhr, certain clays, calcium carbonate, finely divided asbestos, lime, and finely divided mica. This deposit may suitably be applied to the leaves by preparing a suspension of the particular material in a suitable liquid, such as filtered oil, and feeding the same to the filter press until a suitable layer of the suspended matter builds up on each filter-leaf.

The solid matter in the suspension should be such that it will remain suspended in the oil for sufficient time to effect the necessary coating. At the same time, it should have a sufficient quantity of particles of such size that they will be retained by the fine wire mesh so that a satisfactory deposit builds up.

As a specific example, it may be stated that a suitable suspension may comprise one thousand gallons of filtered oil containing about eighty pounds of fairly finely divided kieselguhr. This suspension may be passed through the filter until about 0.2 pound is deposited on each square foot of filtering surface. The filtration of the tar is then conducted, in the manner above described. It is found, however, that when the press is opened after steaming, the cake is readily and completely detached. The outer surface of the pre-coat falls away with the cake, leaving nothing but steamed kieselguhr coating on the filter leaves, so that fires on the filter medium are avoided.

The use of the mineral pre-coat enables less effective steaming or cooling to be employed, since the risk of spontaneous combustion is practically restricted to the dumped filter-cake and any fires can be readily extinguished without danger to the apparatus.

Although the present invention has been described in connection with the details of a specific example thereof, it is not intended that such details shall be regarded as limitations upon the scope of the invention except in so far as included in the accompanying claims.

We claim:

1. The method of filtering hot tars which comprises applying a pre-coat of incombustible mineral matter to the filter media of a filter leaf, forcing hot tar through said media into said leaf, cooling the leaf by means of steam, and removing the solid matter therefrom.

2. The method of filtering tars which comprises suspending a relatively finely divided incombustible material in oil, forcing said oil through filter-leaves until the filter media thereof become coated with said incombustible material, forcing hot tar through said filter media, cooling the media and solid material deposited thereon by contacting the same with relatively cool steam, and removing said solid matter from the filter leaves.

3. The method of filtering hot tars which comprises applying a pre-coat of incombustible mineral matter to the filter media of a filter-leaf, forcing hot tar through said media into said leaf, and passing steam through the leaf to effect cooling of the solid matter thereon, and removing the solid matter therefrom.

4. The method of filtering tars which comprises preparing a suspension of a relatively finely divided incombustible mineral material, forcing said suspension through filter-leaves until the filter media thereof become coated with said mineral material, forcing hot tar through said filter media, passing steam through the media and solid material deposited thereon to effect cooling of the latter, and removing said solid matter from the filter-leaves.

5. The method of filtering tars which comprises suspending a relatively finely divided incombustible material in oil, forcing said oil through filter-leaves until the filter media thereof become coated with said material, forcing hot tar through said filter media, passing steam through the media and solid material deposited thereon to effect cooling of the latter, and removing said solid matter from the filter-leaves.

6. The method of filtering hot tars which comprises applying a pre-coat of kieselguhr to the filter media of a filter-leaf, forcing hot tar through said media into said leaf, cooling the leaf by contacting it with steam, and removing the solid matter therefrom.

7. The method of filtering hot petroleum tar which comprises passing a suspension of kieselguhr through a filter-press until a pre-coat of kieselguhr is deposited on the filter-leaves of said press, forcing the tar in hot condition through said leaves until a cake of solid material is built up thereon, cooling the filter-press by means of relatively cool steam, opening it and removing the filter cake and part of the pre-coat from said leaves.

8. The method of filtering hot petroleum tar which comprises passing a suspension of kieselguhr trough a filter-press until a pre-coat of kieselguhr is deposited on the filter-leaves of said press, forcing the tar at about 600° F. through said leaves until a cake of solid material is built up thereon, cooling the filter press to about 350° F. by passing steam therethrough, opening it and removing the filter cake and part of the pre-coat from said leaves.

9. The method of filtering hot petroleum tar which comprises passing a suspension of kieselguhr through a filter-press until a pre-coat of kieselguhr is deposited on the filter leaves of said press, forcing the tar in hot condition through said leaves until a cake of solid material is built up thereon, passing steam through said press until the temperature reaches about 350° F., opening it and removing the filter cake and part of the pre-coat from said leaves.

10. The method of filtering hot tars containing lime which comprises preliminarily applying a pre-coat of incombustible mineral matter to the filter media of a filter leaf disposed in a closed filter press, then forcing hot tar through said filter media, cooling accumulated solids upon the filter media of the filter leaf and then opening said filter press and removing the accumulated solids from the filtering media on said leaf, said coating of mineral matter protecting the filtering media from any spontaneous combustion of the accumulated lime containing solids thereon, when said filter press is open.

11. The method of filtering hot tars containing coke and lime which comprises preliminarily applying a pre-coat of incombustible mineral matter to the filter media of a filter leaf disposed in a closed filter press, then forcing hot tar into said filter press and passing it through said filter media and into said leaf, cooling accumulated solids upon the filter media of the filter leaf and then opening said filter press and removing the accumulated solids from the filtering media on said leaf, said coating of mineral matter protecting the filtering media from any spontaneous combustion of the accumulated coke and lime containing solids thereon, when said filter press is open.

12. The method of filtering hot tars containing lime which comprises preliminarily applying a pre-coat of kieselguhr to the filter media of a filter leaf disposed in a closed filter press, then forcing hot tar through said filter media, cooling accumulated solids upon the filter media of the filter leaf and then opening said filter press and removing the accumulated solids from the filtering media on said leaf, said coating of kieselguhr protecting the filtering media from any spontaneous combustion of the accumulated lime containing solids thereon, when said filter press is open.

13. The method of filtering hot tars containing coke and lime which comprises preliminarily applying a pre-coat of kieselguhr to the filter media of a filter leaf disposed in a closed filter press, then forcing hot tar into said filter press and passing it through said filter media and into said leaf, cooling accumulated solids upon the filter media of the filter leaf and then opening said filter press and removing the accumulated solids from the filtering media on said leaf, said coating of kieselguhr protecting the filtering media from any spontaneous combustion of the accumulated coke and lime containing solids thereon, when said filter press is open.

14. In the art of filtering hot viscous tars containing lime wherein said tars are passed through a filter medium and the accumulated solids thereon are cooled and then removed therefrom, the method of protecting the filtering surface of the filtering medium from the spontaneously combustible layer of oily lime compounds accumulated thereon which comprises applying a pre-coat of incombustible mineral matter to the filtering surface preliminarily to beginning the tar filtering operation.

15. In the art of filtering hot viscous tars containing lime wherein said tars are passed through a filter medium and the accumulated solids thereon are cooled and then removed therefrom, the method of protecting the filtering surface of the filtering medium from the spontaneously combustible layer of oily lime compounds accumulated thereon which comprises applying a pre-coat of kieselguhr to the filtering surface preliminarily to beginning the tar filtering operation.

16. In the art of filtering hot viscous tars containing calcium compounds and particularly lime wherein said tars are passed through a filter medium and the accumulated solids are cooled and then removed therefrom, the method of preventing the formation of a spontaneously combustible layer of oily calcium compounds on the filtering surface of the filter medium which comprises applying a pre-coat of incombustible mineral material to the filtering surface of the filter medium before beginning the filtering operation.

17. In the art of filtering hot viscous tars containing calcium compounds and particularly lime wherein said tars are passed through a filter medium and the accumulated solids are cooled and then removed therefrom, the method of preventing the formation of a spontaneously combustible layer of oily calcium compounds on the filtering surface of the filter medium which comprises applying a pre-coat of kieselguhr to the filtering surface of the filter medium before beginning the filtering operation.

18. In the art of filtering hot viscous tars containing lime wherein said tars are passed into a filter press and through filter media therein, the filtered solid matter accumulating in the form of a cake-like layer, the said filtered solid matter being cooled and the press then opened and the filtered solid matter removed from the filter media, the method of protecting the filtering surface of the filter media from spontaneously combustible oily lime solid matter contained in said layer of filtered solid matter which comprises, applying a pre-coat of incombustible solid mineral matter to the filtering surface preliminarily to beginning the tar filtering operation.

19. In the art of filtering hot viscous tars containing lime wherein said tars are passed into a filter press and through filter media therein, the filtered solid matter accumulating in the form of a cake-like layer, the said filtered solid matter being cooled and the press then opened and the filtered solid matter removed from the filter media, the method of protecting the filtering surface of the filter media from spontaneously combustible oily lime solid matter contained in said layer of filtered solid matter which comprises, applying a pre-coat of kieselguhr to the filtering surface preliminarily to beginning the tar filtering operation.

20. The method of filtering hot tars which comprises applying a pre-coat of incombustible mineral matter to the filter media of a filter leaf disposed in a closed filter press, forcing the hot tars through said filter media until the solid matter accumulated therein has reduced the rate of filtration to a pre-determined minimum, cooling said filter media in a non-oxidizing atmosphere to a temperature below the ignition point of said solid matter and then removing the accumulated layer from the filter media of said leaf.

CARLYLE D. READ.
ROGER L. HOLCOMB.